July 14, 1942.    L. D. DANFORTH    2,289,828
METHOD OF MAKING DIAPHRAGM LOCK NUTS
Filed Dec. 30, 1940

INVENTOR.
Louis D. Danforth
BY

Patented July 14, 1942

2,289,828

UNITED STATES PATENT OFFICE 2,289,828

METHOD OF MAKING DIAPHRAGM LOCK NUTS

Louis D. Danforth, Los Angeles, Calif., assignor of one-twelfth to Samuel Reginald Smith, two-twelfths to G. C. Lambert, three-twelfths to W. Reid Ferguson, and fourth-twelfths to Henry A. Irwin, all of Los Angeles, Calif., and one-sixth to Aero Inventions Inc., Las Vegas, Nev., a corporation of Nevada Application December 30, 1940, Serial No. 372,292

5 Claims. (Cl. 10—86)

The present invention is complementary to my co-pending application for patent entitled "Diaphragm lock nut," and concerns the method of making the same.

The object of this invention is to provide a simple, practical, and efficient method of making a lock nut having a diaphragm integrally formed in connection therewith and which is useful in imposing pressure upon the interlocked threads of a nut and bolt to deter rotation of one with respect to the other.

Other objects of the invention may appear from the accompanying drawing, the specification and the appended claims.

Figure 1:
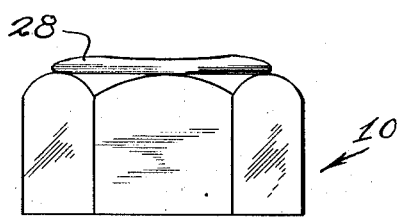
Figure 1 is an elevational view of the finished product of this invention.
Figure 3:
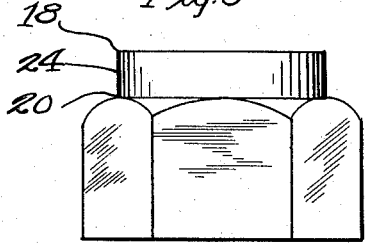
Figure 3 is a side-elevational view showing an intermediate stage of diaphragm nut formation, particularly showing the diaphragm forming collar after cutting but before deformation.
Figure 2:
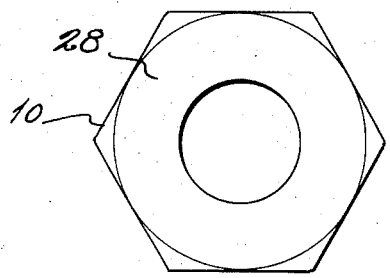
Figure 2 is a plan view thereof.
Figure 4:
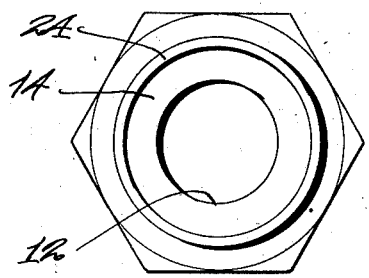
Figure 4 is a plan view of the stage of construction shown in Figure 3.

The reference character 10 indicates the completed product of this invention, and while the nut is here shown as formed from hexagonal stock, quite obviously it can be formed from stock having any suitable exterior configuration, and from stock having a prerequisite specification.

After selection of the material from which it is proposed to form the nut, a suitable length is cut from the mass of stock. The piece of material thus severed is then placed in a suitable machine, such as a lathe, and is bored as at 12 in a direction longitudinal of the axis of the stock to provide an area for subsequently cut threads. After the bore 12 is thus formed an enlarged bore is made in the stock including the chamfered face 14 which point forms the upper thread limit of the nut body. The inner walls of the bore 16 are parallel with the longitudinal axis of the nut and are sufficiently spaced therefrom as to permit the development of a later described diaphragm.

Upon completion of the bores 12 and 16 including the chamfered face 14, a cut is taken upon the exterior of the stock and such cut extends from points 18 to 20, the latter of which is substantially in a transverse plane with the point 22 at the intersection of the inner walls of the bore 16 and the chamfered edge 14. The area defined by these points is cut away until only a relatively thin section remains and this section is formed with an outer face which flares outwardly as shown in Figure 5, thus forming what may be termed at this point, a collar 24.

The section of the collar along the top edge thereof is of such dimension as may be needed depending upon the number of threads to be formed therein, while the base of the collar is of such dimension as to permit an annular groove 26 to be cut therein and yet leave sufficient stock to carry the quite considerable stress imposed upon the diaphragm when fully developed from the collar.

Figure 5:
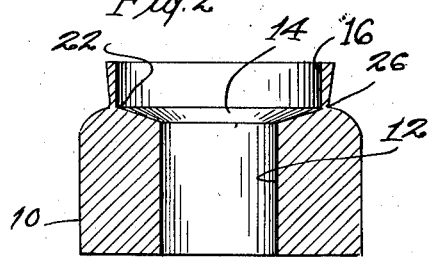
Figure 5 is a sectional view of the nut of this invention showing an exterior cut made in the collar for the purpose of giving the collar section a taper extending inversely from the base thereof and including an annular groove or demarcation line used as a subsequent point of flexure.
Figure 6:
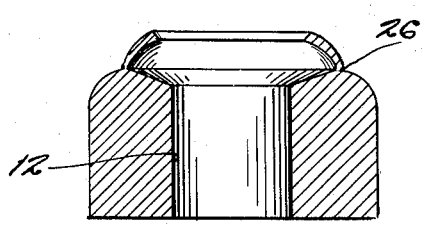
Figure 6 is a view comparable with Figure 5 modified to the extent that the collar is here shown bent over to a point intermediate with respect to the vertical and horizontal.
Figure 7:
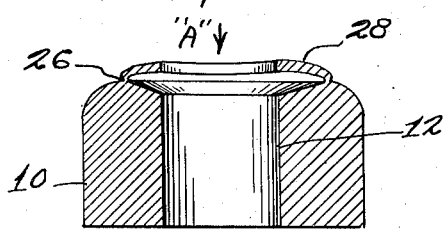
Figure 7 is a mid-sectional view showing the collar bent into an overhanging position with respect to the body of the nut, the body of the nut at this stage as in the stages shown in Figures 3, 4, 5, and 6 is bored and ready to receive cut threads.
Figure 8:
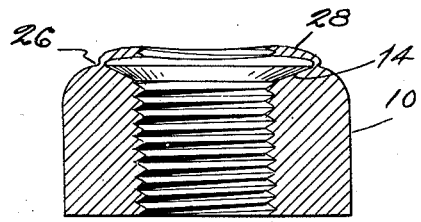
Figure 8 is a mid-sectional view of the finished diaphragm nut of this invention.
Figure 9:
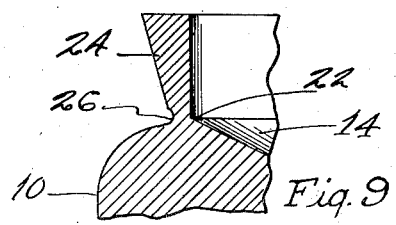
Figure 9 is a fragmental view showing in particular the annular groove or demarcation line formed at the base of the collar and which is adapted to form a scoring line for inward bending of the collar.

Following creation of the collar 24, the same is placed in relative rotation with rollers (not shown) and pressure is applied in such manner as to cause the upper portion of the collar to move inwardly through progressive stages as shown in Figure 6 until the collar has moved from a vertical position as shown in Figure 5 until it occupies a practically horizontal position as shown in Figure 7, which position is in completion of the development of the diaphragm.

Upon completion of the diaphragm 28 which was of course created from the collar 24, a tap is applied to the top surface of the diaphragm entering in the direction of the arrow A to cut threads in the diaphragm and continuing is used to cut threads in the bore 12. Upon completion of thread cutting the space between the overhanging diaphragm and the chamfered face 14 may be reduced from the normal created in the just described threading operation so as to create a predetermined degree of off-set thread lead between the threaded body portion of the nut and the threaded diaphragm.

The preceding matter completes the description of the method I employ in forming my diaphragm lock-nuts.

The just described order of procedure may of course be varied to meet the particular requirements of one who undertakes to practice the method herein described, or to meet the order of operations performed in the machine used to perform the several steps herein set forth, and any such varying of procedure may be had depending upon personal inclination or automatic machine requirement.

It is possible that various changes and modifications and variations may be made in practicing the invention in departure from the particular showing of the drawing and description as given, without however, departing from the true spirit of the invention as defined by the scope of the appended claims, accordingly the present illustration is to be considered only as my preferred form of the invention, and the claims are to be considered the measure of the true scope thereof.

I claim:

1. The method of forming a lock-nut which comprises utilizing a given length of stock, forming bores therein of different diameter, the creation of a collar of reduced wall thickness on said stock the inner surface of which is defined by the greater of said bores, bending said collar inwardly from its plane of joinder with the body of said stock to form an overhanging diaphragm which occupies a position substantially parallel with the base of the nut, and then tapping the said diaphragm and the lesser of said bores to form threads therein.

2. The method of forming a lock-nut which comprises utilizing a given length of stock, forming aligned bores therein of different diameter with a shoulder surface where said bores join, removing metal from a surface exterior of the greater of said bores to form a collar having a tapered section, bending said collar inwardly from adjacent its plane of joinder with the body of said stock to form an overhanging apertured diaphragm occupying a position substantially parallel with the base of the nut, and then forming threads of equal diameter in said diaphragm and the body of the nut by entering a tap through the diaphragm.

3. The method of forming a lock-nut which comprises utilizing a given length of stock, forming aligned communicating bores therein of different diameters, removing material from the surface of the stock exterior of the greater of said bores whereby the said exterior surface is outwardly flared to form an annulus, forming a groove in the base of said annulus, and then bending said annulus inwardly to flex at said groove until said annulus occupies a position substantially parallel with the base of the unit to form a diaphragm, and then forming threads in the said diaphragm and the lesser of said bores, said threads being formed by entering a tap first through said diaphragm and then through said lesser of the bores.

4. The method of forming a lock-nut which comprises utilizing a given length of stock, forming aligned communicating bores of different diameters therein, the removing of metal from a surface exterior of the greater of said bores whereby the said exterior surface is outwardly flared from the base of a collar thus defined, the formation of an annular groove in said base, the rolling of the said collar inwardly from said groove until it occupies a position substantially parallel with the base of the length of stock to form an apertured diaphragm, forming threads of equal diameter in said diaphragm and the lesser of said bores by entering a tap first through said diaphragm, and then pressing said diaphragm inwardly toward the principal portion of said lock-nut whereby an off-set relationship is created between the threads of said diaphragm and the lesser of said bores.

5. The method of forming a lock-nut which comprises utilizing a length of metal stock, the forming of aligned bores of different diameters therein, the removal of metal from the external surface of the stock around the greater of said bores whereby the said exterior surface is flared or inclined from the base of the collar thus formed, the forming of an annular groove in the base portion of the collar, the rolling of said collar inwardly toward the axis of said bores to flex at said annular groove, the rolling being continued until the collar occupies a position substantially parallel with the base of the stock, the formation of threads in the collar thus rolled over and in the lesser of said bores by entering a tap first through the rolled over collar and then through the lesser of said bores, and then bending the rolled over collar inwardly toward the portion of the stock carrying the smaller of the bores to create an axially offset relation between said threads.

LOUIS D. DANFORTH.